(12) United States Patent
Ishimasa et al.

(10) Patent No.: US 11,131,266 B2
(45) Date of Patent: Sep. 28, 2021

(54) CONTROL DEVICE OF INTERNAL COMBUSTION ENGINE

(71) Applicant: HONDA MOTOR CO., LTD., Tokyo (JP)

(72) Inventors: Jyo Ishimasa, Wako (JP); Masaya Agata, Wako (JP); Jingyu Zhu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 211 days.

(21) Appl. No.: 16/451,568

(22) Filed: Jun. 25, 2019

(65) Prior Publication Data
US 2019/0390624 A1 Dec. 26, 2019

(30) Foreign Application Priority Data

Jun. 26, 2018 (JP) .............................. JP2018-120935

(51) Int. Cl.
*F02D 41/24* (2006.01)
*F02D 41/18* (2006.01)
(Continued)

(52) U.S. Cl.
CPC ........... *F02D 41/2451* (2013.01); *F02D 9/08* (2013.01); *F02D 41/0002* (2013.01);
(Continued)

(58) Field of Classification Search
CPC ........ F02D 9/08; F02D 41/0002; F02D 41/18; F02D 41/2445; F02D 41/2451; F02D 2009/0255; F02D 2200/0404
See application file for complete search history.

(56) References Cited

U.S. PATENT DOCUMENTS 6,957,140 B1 * 10/2005 Bauerle .................... F02D 9/02
123/399
9,476,372 B2 * 10/2016 Worthing ................ F02D 41/18

FOREIGN PATENT DOCUMENTS

JP  2006-22696 A   1/2006
JP  2008-175141 A  7/2008
(Continued)

OTHER PUBLICATIONS

Office Action dated Nov. 5, 2019, issued in counterpart JP application No. 2018-120935, with English translation. (11 pages).
(Continued)

*Primary Examiner* — Hung Q Nguyen
*Assistant Examiner* — Mark L. Greene
(74) *Attorney, Agent, or Firm* — Westerman, Hattori, Daniels & Adrian, LLP

(57) ABSTRACT

A control device of an internal combustion engine can respond to the variation of the flow reduction rate attributable to the difference in a clogging condition, and which can detect a deposit accumulation amount even if no idle condition is provided like HEV, etc. In a control device of an internal combustion engine, a map correction section determines a correction amount in accordance with an approximate line result based on an air amount at a predetermined opening degree at which the measurement of the air amount by an air flow meter is sufficiently performed with the exception of a first predetermined opening degree in the case where the measurement of the air amount by the air flow meter has not been performed sufficiently in the first predetermined opening degree in a current operation cycle.

5 Claims, 6 Drawing Sheets

(51) Int. Cl.
  *F02D 41/00* (2006.01)
  *F02D 9/08* (2006.01)
  *F02D 9/02* (2006.01)

(52) U.S. Cl.
  CPC ......... *F02D 41/18* (2013.01); *F02D 41/2445* (2013.01); *F02D 2009/0255* (2013.01); *F02D 2200/0404* (2013.01)

(56) References Cited

FOREIGN PATENT DOCUMENTS

| | | | |
|---|---|---|---|
| JP | 2009-85075 | A | 4/2009 |
| JP | 2012-17679 | A | 1/2012 |
| JP | 2012-154289 | A | 8/2012 |
| JP | 2014-169628 | A | 9/2014 |
| JP | 2015-90112 | A | 5/2015 |
| JP | 2015-214925 | A | 12/2015 |

OTHER PUBLICATIONS

Office Action dated May 26, 2020, issued in counterpart JP Application No. 2018-120935, with English Translation. (6 pages).

* cited by examiner

CONTROL DEVICE OF INTERNAL COMBUSTION ENGINE

CROSS REFERENCES TO RELATED APPLICATIONS

The present application claims priority under 35 U.S.C. § 119 to Japanese Patent Application No. 2018-120935, filed Jun. 26, 2018, entitled "CONTROL DEVICE OF INTERNAL COMBUSTION ENGINE." The contents of this application are incorporated herein by reference in their entirety.

TECHNICAL FIELD

The present disclosure relates to a control device of an internal combustion engine.

BACKGROUND

Until now, it is known that a throttle opening degree is electronically controlled in accordance with a stepping-on amount of an accelerator pedal and the like, in a gasoline engine which is an internal combustion engine (for example, see Japanese Patent Application Publication No. 2006-022696). In this control, a throttle opening area is calculated when the engine is in an idle state and when an intake air amount, an atmospheric pressure, and an intake air temperature are stabilized. Moreover, the throttle opening area is subtracted from a reference opening area in a reference deposit accumulation state which is a state of no accumulation, and an opening area change amount (a deposit accumulation amount) is calculated. Then, the opening area change amount is reflected in a target throttle opening degree in the whole operation range.

SUMMARY

In the control described in Japanese Patent Application Publication No. 2006-022696, although a variation arises in a flow reduction rate attributable to the difference in a clogging condition of an intake pipe of the engine in accordance with the throttle opening degree, it cannot respond to the variation of the flow reduction rate attributable to the difference in the clogging condition since the deposit accumulation amount calculated in the idle state is reflected in the whole operation range. In other words, as shown in FIG. 8, although a measured value and the maximum clogging value are not remarkably estranged from each other in the calculation range id in the idle state, the estrangement between them increases in size as the throttle opening degree increases. FIG. 8 is a diagram for explaining the conventional control. Then, the clogging rates are largely different and estranged between the value in the calculation range id in the idle state and the value in the case where the throttle opening degree is in the vicinity of 15 degrees. It cannot respond to such estrangement of values due to the throttle opening degree.

Further, in an HEV or the like, there is no idle condition since a transition is performed to an EV mode. Therefore, there may be cases where the deposit accumulation amount cannot be detected.

Therefore, it is preferable to provide a control device of an internal combustion engine which can respond to the variation of the flow reduction rate attributable to the difference in a clogging condition, and which can detect a deposit accumulation amount even if no idle condition is provided like HEV, etc.

(1) According to one aspect of the present disclosure, a control device of an internal combustion engine comprises a map storage section (for example, see "map storage section 61" below) for previously storing, as a map, a characteristic of an intake air amount in accordance with the opening degree of a throttle valve (for example, see "throttle valve 5" below) provided in an intake passage (for example, see "intake pipe 11" below) of an internal combustion engine (for example, see "engine 1" below), and a map correction section (for example, see "map correction section 62" below) for detecting a deposit adhesion to the throttle valve by comparing a value of a flow rate function in a reference state with a value of the flow rate function based on an air amount in the intake passage measured by an air flow meter, at every predetermined opening degree of the throttle valve thereby to correct the map according to a deposition rate, wherein the map correction section determines a correction amount in accordance with an approximate line result based on the air amount at a predetermined opening degree at which the measurement of the air amount by the air flow meter is sufficiently performed with the exception of a first predetermined opening degree in the case where the measurement of the air amount by the air flow meter has not been performed sufficiently in the first predetermined opening degree in the current operation cycle.

(2) The control device of the internal combustion engine described in a feature (1), wherein the map correction section preferably comprises a correction amount renewal part (for example, see "correction amount renewal part 621" below) which does not perform the renewal of the correction amount in the case where a deviation between the approximate line result and the correction amount at the first predetermined opening degree in the previous operation cycle is smaller than the predetermined threshold value and performs the renewal of correction amount by using a weighted average of the approximate line result and the correction amount as a correction amount in the case where the deviation between the approximate line result and the correction amount at the first predetermined opening degree in the previous operation cycle is not smaller than the threshold value. In the above explanation of the exemplary embodiment, specific elements with their reference numerals are indicated by using brackets. These specific elements are presented as mere examples in order to facilitate understanding, and thus, should not be interpreted as any limitation to the accompanying claims.

According to one embodiment of the present disclosure, it is possible to provide the control device of the internal combustion engine which can respond to the variation of the flow reduction rate attributable to the difference in a clogging condition, and which can detect the deposit accumulation amount even if no idle condition is provided like HEV, etc.

DETAILED DESCRIPTION

Figure 1:
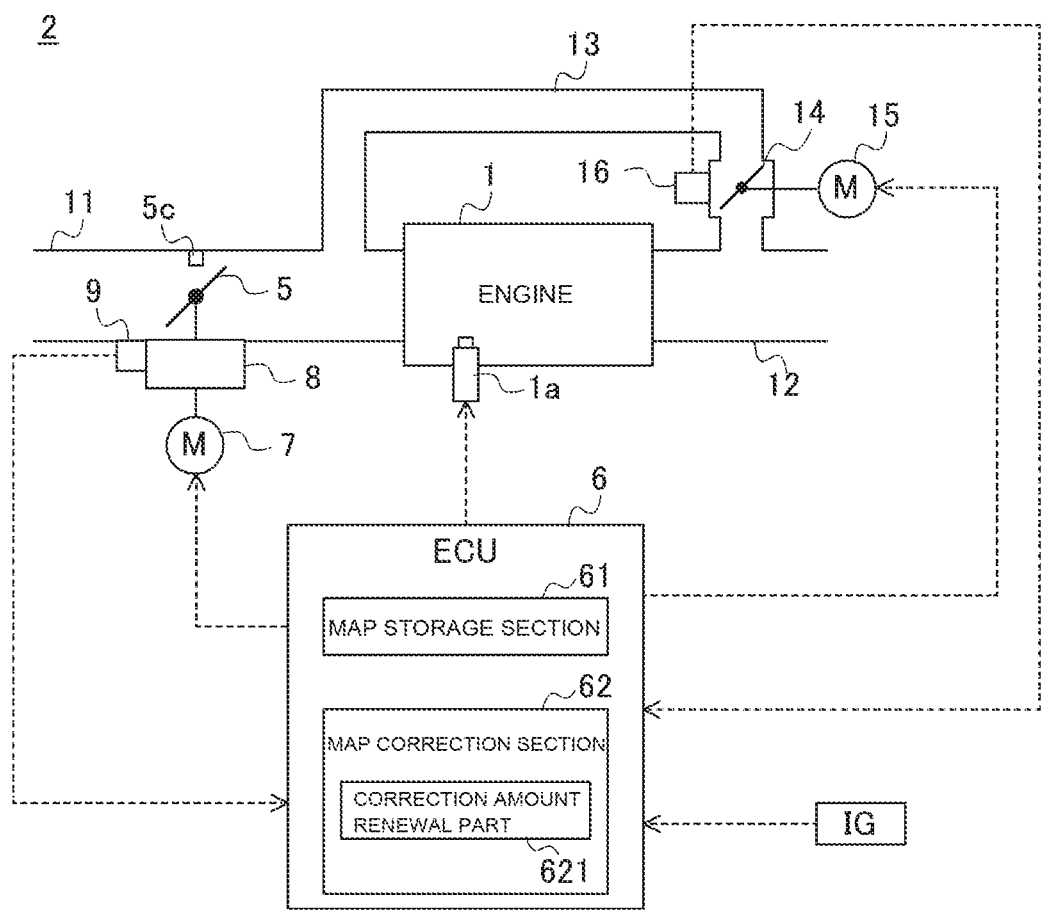
FIG. 1 is a diagram showing the configuration of an engine and a control device thereof in accordance with an embodiment of the present disclosure.

Hereinafter, a first embodiment of the present disclosure will be explained with reference to accompanying drawings. FIG. 1 is a diagram showing the configuration of an internal combustion engine (hereinafter, referred to as "engine") 1 and a control device 2 thereof.

The engine 1 of a vehicle is provided with an intake pipe 11 in which an intake air flows, an exhaust pipe 12 in which an exhaust gas flows, and an EGR pipe 13 through which a portion of the exhaust gas in the exhaust pipe 12 is circulated into the intake pipe 11. The intake pipe 11 is connected to an intake port of each cylinder of the engine 1 through a plurality of branch parts of an intake manifold. The exhaust pipe 12 is connected to an exhaust port of each cylinder of the engine 1 through a plurality of branch parts of an exhaust manifold. The EGR pipe 13 branches away from the exhaust pipe 12 thereby to extend to the intake pipe 11.

The EGR pipe 13 is provided with an EGR valve 14 which controls a flow rate of the circulated exhaust gas. The EGR valve 14 is connected to a drive shaft of an actuator (for example, "motor") through an opening and closing mechanism (not shown). An opening degree of the EGR valve 14 is controlled by adjusting a duty ratio of a drive current which is supplied from a battery (not shown) to the motor 15, by an ECU 6 to be referred to later.

Within the intake pipe 11 of the engine 1, a throttle valve 5 is provided in an openable and closable manner. The throttle valve 5 is connected through an opening and closing mechanism 8 to the drive shaft of the motor 7 functioning as the actuator. The opening and closing mechanism 8 is formed by engaging a plurality of gears and transmits the drive force generated by the motor 7 to a pivot shaft of the throttle valve 5 so as to open and close the throttle valve in the intake pipe 11. The motor 7, for example, is a direct current motor. An opening degree of the throttle valve 5 is controlled by adjusting the duty ratio of a drive current supplied from the battery (not shown) to the motor 7, by the ECU 6. Further, an amount of air introduced into the engine 1 is adjusted by controlling the opening degree of the throttle valve 5.

The intake pipe 11 is provided with a stopper piece 5c which restricts a displacement of the throttle valve 5 to a closing side at a predetermined opening degree. Herein, in the following, the opening degree of the throttle valve 5 in a condition where the displacement of the throttle valve 5 to the closing side is restricted by the stopper piece 5c is defined as the whole closing opening degree. The throttle valve 5 is in a little opened condition from the whole closing opening degree when the motor 7 is not driven.

Further, the intake pipe 11 is provided with a throttle opening degree sensor 9 for detecting the opening degree of the throttle valve 5, and an air flow meter (not shown) for detecting the flow amount of the air in the intake pipe 11. The throttle opening degree sensor 9 generates a detection signal of a voltage in proportion to the opening degree of the throttle valve 5 or a feeding amount of the gear and the like in the opening and closing mechanism 8 which corresponds to the opening degree of the throttle valve 5, so as to input it to the ECU 6. An output voltage of the throttle opening degree sensor 9 is heightened as the throttle valve 5 is opened. The ECU 6 converts the detection signal of the throttle opening degree sensor 9 into A/D, whereby to grasp the opening degree of the throttle valve 5.

The EGR pipe 13 is provided with an EGR opening degree sensor 16 which detects the opening degree of the EGR valve 14. The EGR opening degree sensor 16 generates the detection signal of voltage in proportion to the opening degree of the EGR valve so as to input it to the ECU 6. The ECU 6 converts the detection signal of the EGR opening degree sensor 16 into the A/D, whereby to grasp the opening degree of the EGR valve 14.

The ECU 6 functioning as a control section which forms a control device 2 is a microcomputer which is provided with an I/O interface for converting an output signal of the sensor into the A/D, a CPU for executing various kinds of arithmetic processing, and an RAM or ROM and the like (memory device) for storing various kinds of data. The ECU 6 executes control of a fuel injection from a fuel injection valve 1a of the engine 1 and performs the correction of the map which previously stores a characteristic of the intake air amount in accordance with the opening degree of the throttle valve 5 provided in the intake pipe 11 functioning as the intake passage of the engine 1, by control to be referred to later.

In other words, the ECU 6 has a map storage section 61 and a map correction section 62.

The map storage section 61 previously stores, as the map, the characteristic of the intake air amount in accordance with the opening degree of the throttle valve 5 provided in the intake pipe 11 of the engine 1.

The map correction section 62 detects a deposit adhesion to the throttle valve 5 by comparing a value of a flow amount function in a reference state with a value of the flow amount function based on the air amount in the intake pipe 11 measured by an air flow meter (not shown), at every predetermined opening degree of the throttle valve 5, thereby to correct the map according to a deposition rate.

In other words, the map correction section, as mentioned below, determines a correction amount in accordance with an approximate line result based on the air amount at a predetermined opening degree at which the measurement of the air amount by the air flow meter is sufficiently performed with exception of a first predetermined opening degree in the case where the measurement of the air amount by the air flow meter has not been performed sufficiently in the first predetermined opening degree in a predetermined zone in the current driving cycle (operation cycle).

Further, the map correction section 62 has a correction amount renewal part 621. The correction amount renewal part 621, as mentioned below, does not perform the renewal of the correction amount in the case where a deviation between the approximate line result and the correction amount at the first predetermined opening degree in the previous driving cycle is smaller than the predetermined threshold value. However, it performs the renewal of correction amount by using a weighted average of the approximate line result and the correction amount as a correction amount in the case where the deviation between the approximate line result and the correction amount at the first predetermined opening degree in the previous driving cycle during a period from the time that the ignition switch is previously turned on to the time that it is turned off is not smaller than the threshold value. The control with respect to the map storage section 61, the map correction section 62, and the correction amount renewal part 621 will be explained in detail in the explanation of a flow chart showing the processes of the control to be referred to below.

Next, the control which is executed in the control device 1 of the internal combustion engine of this embodiment provided with the above mentioned configuration and which corrects the map of the characteristic of the intake air amount according to the opening degree of the throttle valve 5 located in the intake pipe 11 of the engine 1 will be explained in detail with reference to FIGS. 2 to 7. The control is performed during travelling of the vehicle.

Figure 2:
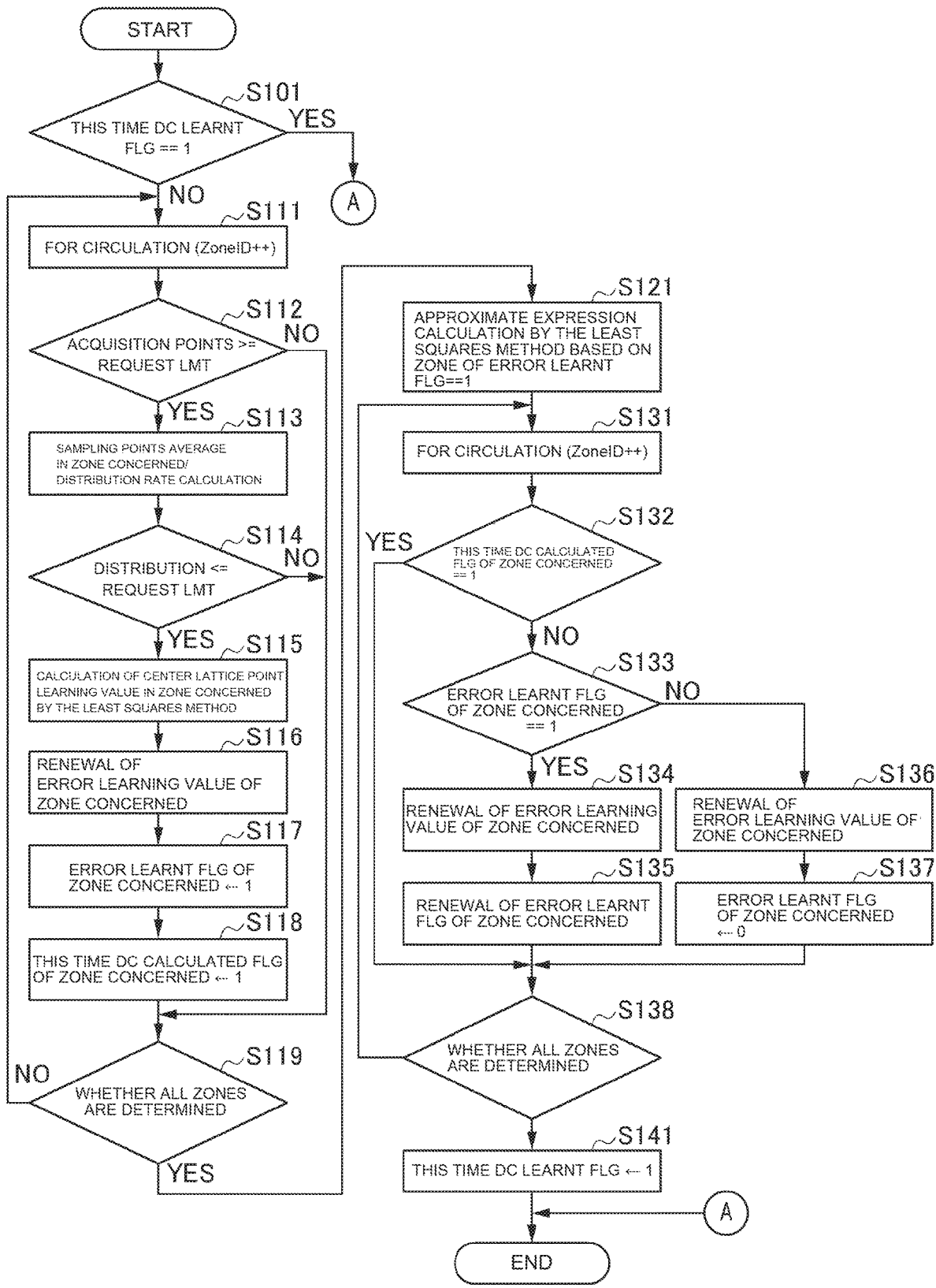
FIG. 2 is a flowchart showing processes of the processing by a control section of the control device in accordance with the present disclosure.
Figure 3:
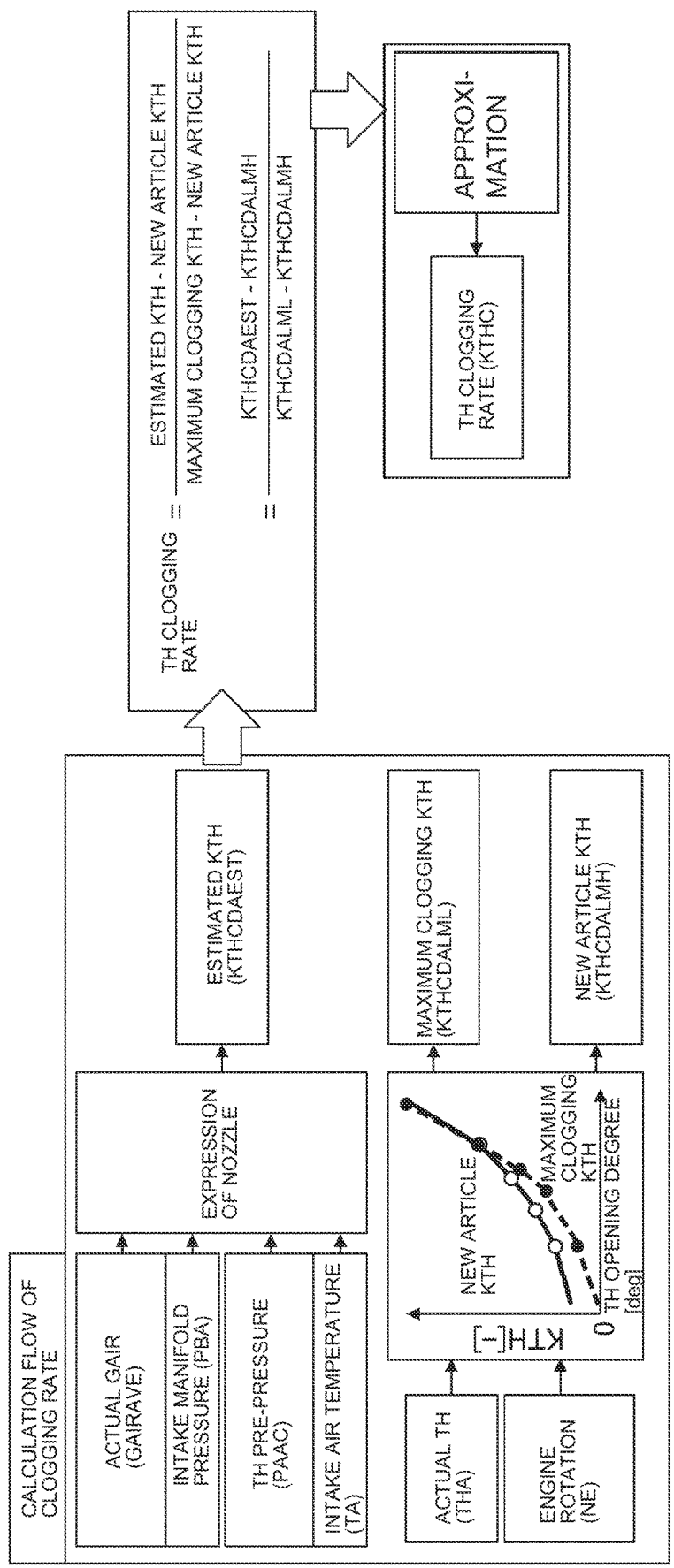
FIG. 3 is an explanatory diagram showing processes of calculation of a clogging rate used in the processing of the control section of the control device in accordance with the present disclosure.
Figure 4:
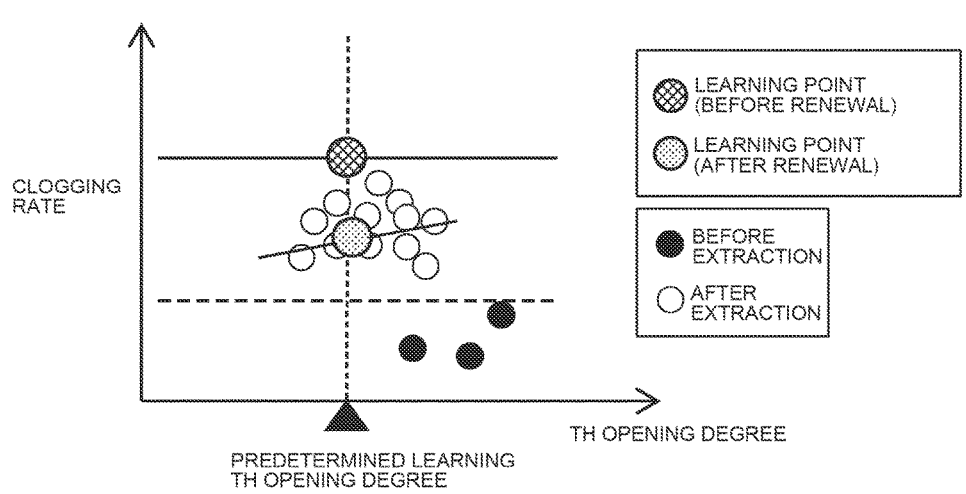
FIG. 4 is a diagram explaining the processing for finding a learning point from the clogging rate calculated in the processing of the control section of the control device in accordance with the present disclosure.
Figure 5:
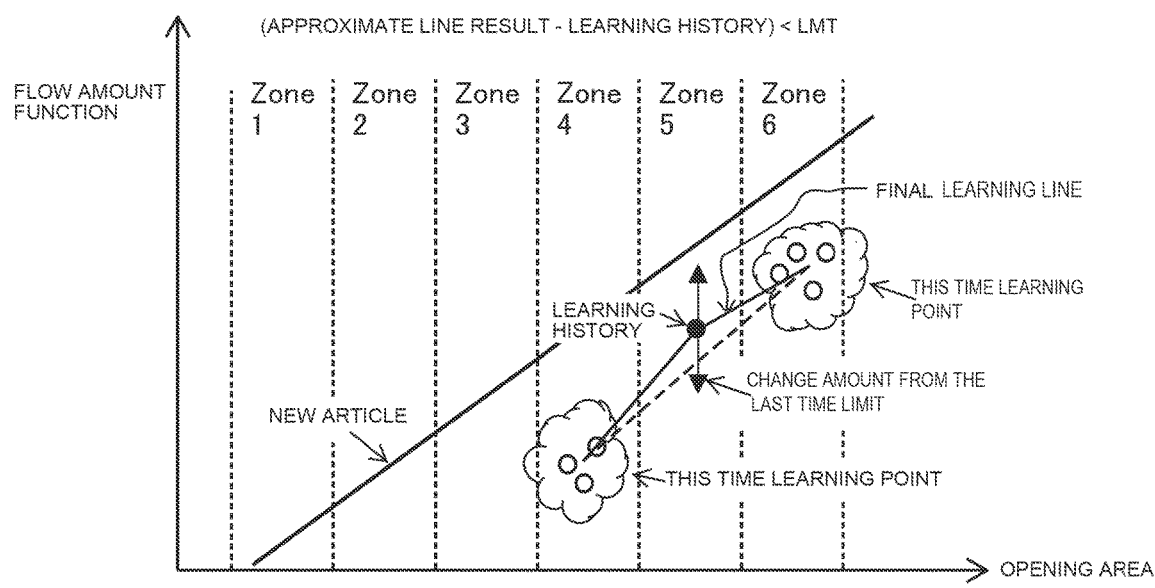
FIG. 5 is a diagram for explaining the case where the learning point is not renewed, in the processing of the control section of the control device in accordance with the present disclosure.
Figure 6:
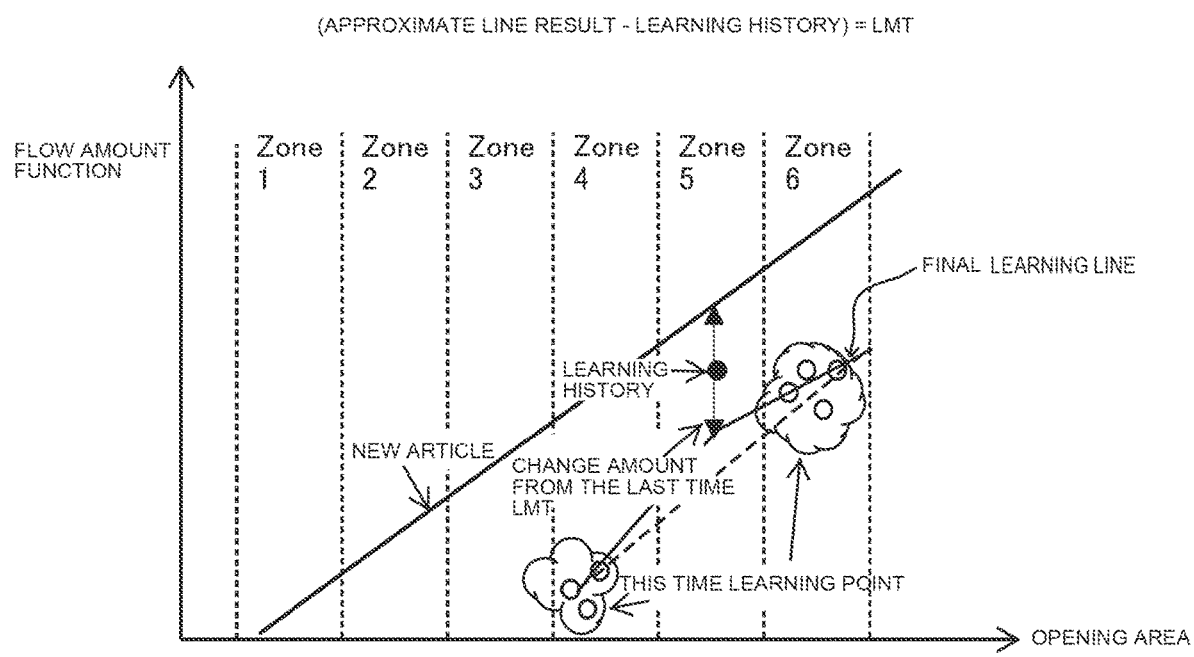
FIG. 6 is a diagram for explaining the case where the learning point is renewed, in the processing of the control section of the control device in accordance with the present disclosure.
Figure 7:
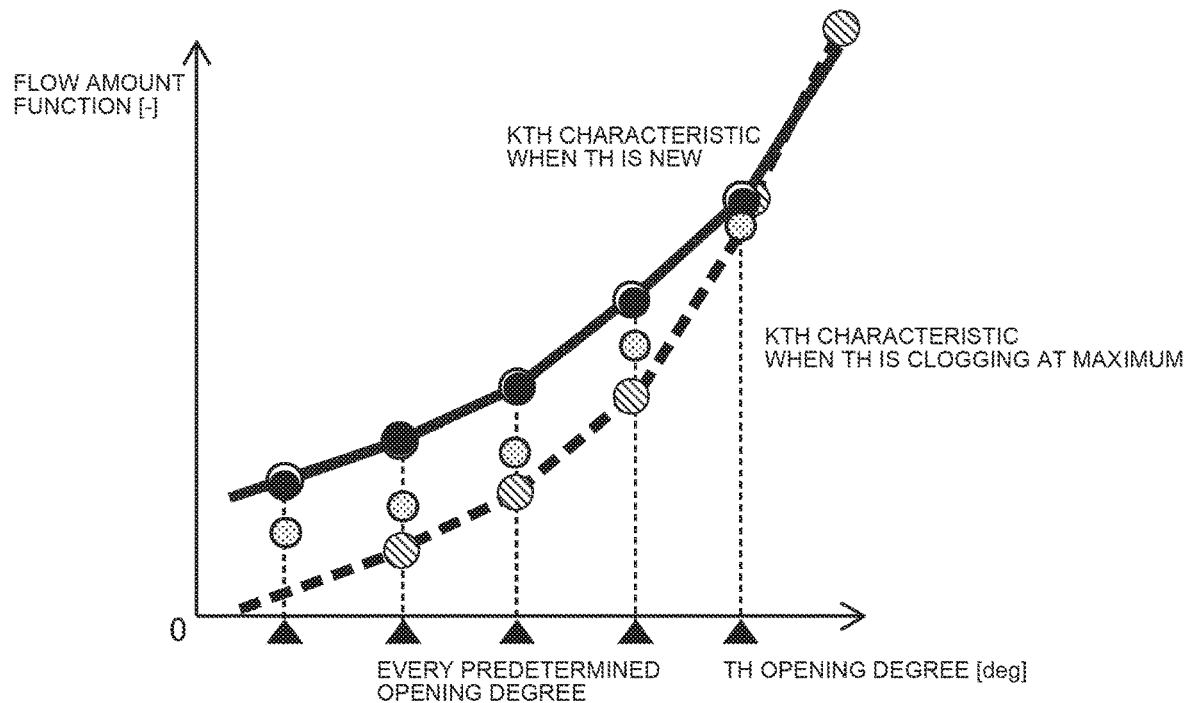
FIG. 7 is a diagram for explaining a relationship between the learning point obtained in the processing of the control section of the control device, a flow amount characteristic of a brand-new throttle, and the flow amount characteristic at the time of the maximum clogging of the throttle in accordance with the present disclosure.
Figure 8:
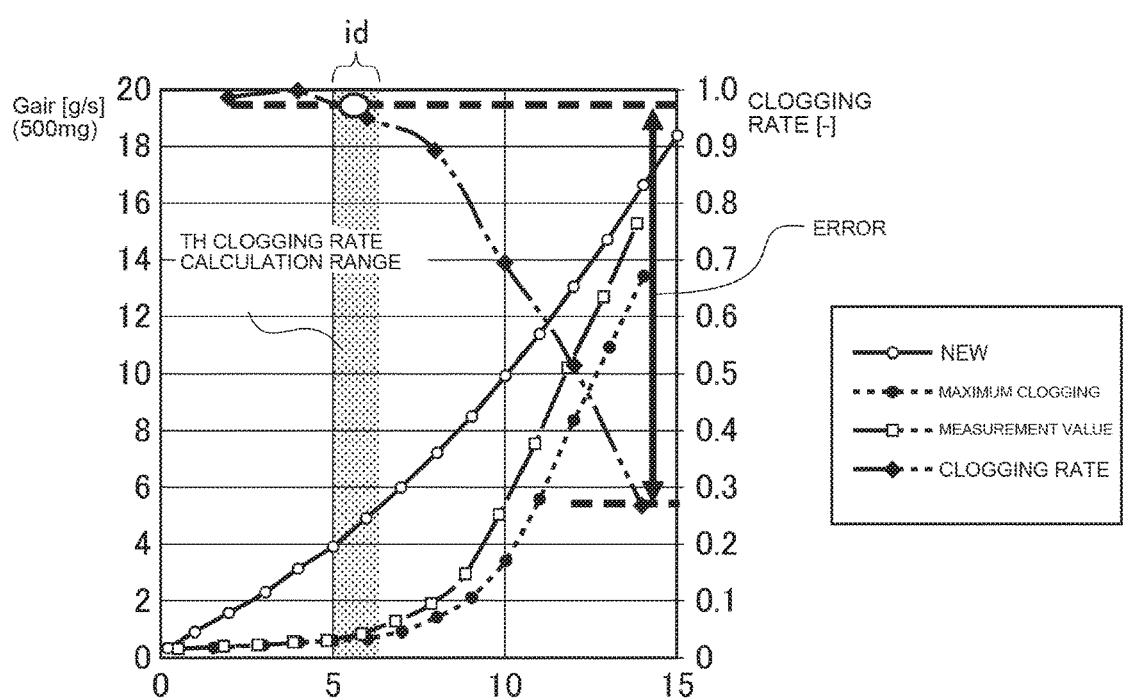
FIG. 8 is a diagram for explaining a conventional control.

FIG. 2 is a flow chart showing the processes of the processing by the control section of the control device 2. FIG. 3 is an explanatory diagram showing the processes of calculation of the clogging rate used in the processing of the control section of the control device 2. FIG. 4 is a diagram explaining the processing for finding a learning point from the clogging rate calculated in the processing of the control section of the control device 2. FIG. 5 is a diagram for explaining the case where the learning point is not renewed, in the processing of the control section of the control device 2. FIG. 6 is a diagram for explaining the case where the learning point is renewed, in the processing of the control section of the control device 2. FIG. 7 is a diagram for explaining a relationship between the learning point obtained in the processing of the control section of the control device 2, the flow amount characteristic of a brand-new throttle, and the flow amount characteristic at the time of the maximum clogging of the throttle.

In a Step S101, whether or not this time driving cycle (DC) learnt FLG is to be "1" is determined. In other words, whether the processing of the flow chart shown in FIG. 2 is already performed (FLG==1) or not (FLG==0) in this time driving cycle is determined. If this determination is NO, the process proceeds to a Step 111. If YES, this processing ends.

In the Step S111, an addition of "1" to a Zone ID is made for performing the processes of S111 to S119 in order previously with respect to all of plural zones divided into plural opening degree areas corresponding to values of plural throttle opening degrees at 1-to-1, respectively. First, when the processes of S111 to S119 are performed, "1" is added to the Zone ID in which the value of "0" is inputted, whereby to be made to be "1" of the first zone number.

Then, several values of the throttle clogging rates (KTHC) are obtained by using an expression for obtaining the clogging rate shown in FIG. 3, and the obtained value is plotted in a graph as the value of the clogging rate after extraction, as shown in FIG. 4. Then, in FIG. 4, an item which is preserved prior to extraction, that has a smaller clogging rate than the threshold value shown in broken lines at a position of a lower value than the approximate line shown in a solid line and an item of the smaller value than the threshold value shown in the broken lines among the clogging rates which is extracted this time are not used for estimating the flow amount function since they are far from the approximate line shown in the solid line.

Specifically, the clogging rate is obtained more than one in the following way. However, there may be a case where no clogging rate is obtained since the opening degree of the throttle does not reach a certain level depending on the operation condition of the vehicle.

First, an estimated throttle flow amount function (KTH) is obtained from an actual GAIR value (GAIRAVE: intake air amount average value) corresponding to an actual intake air flow amount measured by the air flow meter (not shown), an intake manifold pressure (PBA: intake pipe absolute pressure), a throttle pre-pressure (PAAC), and an intake air temperature (TA), by using a known expression of a nozzle.

Further, the estimated throttle flow amount function (KTH) at the time of the maximum clogging and the estimated throttle flow amount function (KTH) at the time of a new article which is a reference condition are obtained from an actual throttle value (THA) and a rotational frequency (NE) of the engine 1. Then, the throttle clogging rate (KTHC) is obtained by using the estimated throttle flow amount function (KTH), the estimated throttle flow amount function (KTH) at the time of the maximum clogging, and the estimated flow amount function (KTH) at the time of the new article which is the reference condition, and further, by performing an approximation properly.

Herein, not the value of the throttle opening degree in a predetermined range which has a range but the value of the throttle opening degree of a pinpoint which has no range is used as the actual throttle value (THA). In other words, in the case where the value of the predetermined throttle opening degree of the pinpoint is obtained, the value from the flow amount obtained by the air flow meter, based on the value in front of and behind the value of the predetermined throttle opening degree is plotted in the graph so as to be used. Then, as mentioned below, an approximate expression is obtained so as to obtain the approximate line, in the zone including the value of this predetermined throttle opening degree as the first predetermined opening degree.

After the throttle clogging rate (KTHC) has been obtained in the method as mentioned above, the process proceeds to a Step S112.

In the Step S112, whether or not the number of the throttle clogging rate (KTHC) obtained in the Step S111 is not smaller than the amount (request LMT) enough to estimate the flow amount function is determined. This is because the opening degree of the throttle may not be over the certain level, depending on the operation condition of the vehicle as mentioned above, and because there may be cases where the throttle clogging rate (KTHC) is not obtained at all or is few in quantity, depending on the predetermined zone. If this determination is YES, the process proceeds to a Step S113. If NO, the process proceeds to a Step S119.

In the step S113, an average value of the throttle clogging rate (KTHC) obtained in the Step S111 and a distribution value are calculated. After calculation, the process proceeds to a Step S114.

In the Step S114, whether or not the distribution value obtained in the Step S113 is smaller than a small value ("request LMT" which is the predetermined value) enough to estimate the flow amount function is determined. If this determination is YES, the process proceeds to a Step S115. If NO, the process proceeds to the Step S119.

In the Step S115, a center lattice point learning value (learning point) in the zone concerned (the first zone) is calculated by using the least squares method. After calculation, the process proceeds to a Step S116.

In the Step S116, an error learning value (leaning point) in the zone concerned (the zone corresponding to the value of the Zone ID) on the stored map is renewed. Specifically, in the case where there is an error learning history in the previous driving cycle, namely, where the renewal of the learning point has been performed in the previous driving cycle, the learning point is renewed into the weighted average value between a new learning result (the learning point obtained by this time process) and a learning history (the learning point which is renewed previously). Why it is renewed in this manner is because the leaning value until the last time driving cycle is considered since the throttle characteristic is not abruptly changed in the driving cycle unit and the abrupt renewal of the learning point is prevented.

On the other hand, in the case where the error learning history is not in existence in the previous driving cycle, in other words, in the case where the renewal of the learning point has not been performed in the previous driving cycle, the learning point is renewed into the weighted average value between the new learning result (the learning point obtained in this time processing) and the last time approximate line result (the point of the value corresponding to the throttle opening degree on the approximate line corresponding to the throttle opening degree obtained in the last time processing). Why it is renewed in this manner is because the abrupt change of the flow amount function is prevented, although it is believed that the new error learning result is an accurate value. After renewal, the process proceeds to a Step S117.

In the Step S117, an error learnt FLG in the zone concerned is to be "1". Thereafter, the process proceeds to a Step S118. Herein, that the error learnt is "1" means that there is an error learning history obtained based on a sampling point (the clogging rate) in the zone concerned (that the learning point has been renewed). Further, that the error learnt FLG is "0" means that there is no error learning history in the zone concerned (that the learning point has not been renewed).

In the Step S118, this time driving cycle calculated FLG in the zone concerned is to be "1". Thereafter, the process proceeds to the Step S119. Herein, that the driving cycle calculated FLG is to be "1" means that the calculation for obtaining the sampling point (the clogging rate) in the zone concerned has been already performed. Further, that the driving cycle calculated FLG is to be "0" means that the calculation for obtaining the sampling point (clogging rate) in the zone concerned is not still performed.

In the Step S119, whether or not the processing with respect to all zones is ended. If this determination is YES, the Zone ID is made to be "0" and the process proceeds to a Step S121. If NO, the process returns to the Step S111.

In the Step S121, the approximate expression is calculated by the least squares method, based on the clogging rate obtained in the zone in which the error learnt FLG is to be "1", namely in the zone in which the renewal of the leaning point has been performed. After calculation, the process proceeds to a Step S131.

In the Step S131, "1" is added to the Zone ID in order to perform the processes from S131 to S138 in order with respect to all of the plural zones previously divided into the opening areas corresponding to the value of the throttle opening degree at 1-to-1, respectively. First, when the processing of S131 to S138 is performed, "1" is added to the Zone ID in which the value of "0" has been inputted, whereby to be made to be "1" which is the number of the first zone.

In a Step S132, whether or not this time driving cycle calculated FLG in the zone concerned is "1", namely, whether or not the calculation for obtaining the sampling point (the clogging rate) in the zone concerned has been already performed in this time driving cycle is determined. If this determination is YES, the process proceeds to the Step S138. If NO, the process proceeds to a Step S133.

In the Step S133, whether or not the error learnt FLG in the zone concerned is "1", namely, whether or not the error learning history obtained based on the sampling point (the clogging rate) in the zone concerned be in existence (whether or not the learning point has been renewed). If this determination is YES, the process proceeds to a Step S134. If NO, the process proceeds to a Step S136.

In the Step S134, as determined in the Step S112, since the throttle opening degree is not over the certain level, depending on the operation condition of the vehicle, the processing in the case where the number of the value of the estimated throttle flow amount function is not in existence, or it is extremely few in the zone concerned is performed.

Specifically, the error learning value (the leaning point) in the zone concerned (the zone corresponding to the value of the Zone ID) is renewed. Specifically, in the case where the value of the difference which subtracts the previous learning history (the learning point) from the approximate line result (the point of the value corresponding to the throttle opening degree on the approximate line (the broken lines in FIG. 5) corresponding to the throttle opening degree, obtained by the last process) is smaller than the predetermined threshold value ("LMT" which is the predetermined value: the range shown by arrows which extend up and down from the point of the learning history in FIG. 5), namely, in the case where the value of the previous learning history (the learning point) falls within the range which is smaller than the predetermined value (the threshold value (the range shown by arrows which extend up and down from the point of the learning history in FIG. 5)) from the approximate line (the broken lines in FIG. 5), the error learning value (the learning point including the correction amount) on the stored map is not renewed. Why it is not renewed in this manner is because the approximate line is not used by believing that the latest renewed error learning value is the accurate value.

On the other hand, in the case where the difference subtracting the learning history before the last time from the approximate line result is equal to or more the predetermined threshold value ("LTM" which is the predetermined value: the range shown by arrows which extend up and down from the point of the learning history in FIG. 6), namely, in the case where the value of the previous learning history (the leaning point) is located in the zone other than the zone concerned (the zone 5 in FIG. 6) and the number of the throttle clogging rate (KTHC) obtained in the Step S111 deviates at the predetermined value (the threshold value (the range shown by arrows which extend up and down from the point of the learning history in FIG. 6)) or more from the approximate line (the broken lines in FIG. 6) obtained from the value of the learning history (the learning point) obtained at the predetermined opening degree in the zone (a right side zone 6 and a left side zone 4 in FIG. 6) which is more than the amount (request LMT) enough to estimate the flow amount function, it is considered that the deposit adhesion to the throttle valve 5 has been detected, and the error learning result (the learning point including the correction amount) is renewed into the approximate line result (the weighted average value between the approximate line (the broken line in FIG. 6) corresponding to the throttle opening degree obtained in the last processing and the learning history (the leaning point obtained previously)) in order to correct the error leaning value (the learning point) stored in the map in accordance with the deposition rate. Why it is renewed in this manner is because the approximate line is used since the error learning history has become older and since there is the possibility of being estranged from the throttle characteristic of the present condition. After processing, the process proceeds to a Step S135.

In the Step 135, when the error learning result (the learning point) has not been renewed in the Step S134, the error learnt FLG is to be "0" in the zone concerned. When the error learning result (the learning point) has been renewed in the Step S134, the error learnt FLG in the zone concerned is made to be "1". After that, the process proceeds to the Step S138.

In the Step S136, in a similar manner to the Step S134, since the throttle opening degree may not be over the certain level depending on the operation condition of the vehicle as determined in the Step S112, the processing in the case where the number of the value of the estimated throttle flow amount function is not in existence, or it is extremely few in the zone concerned is performed. In other words, in the Step S136, the error leaning value (the learning point) in the zone concerned (the zone corresponding to the value of the Zone ID) on the stored map is renewed. Specifically, the error learning result (the learning point) is renewed into the approximate line result (the point of the value corresponding to the throttle opening degree on the approximate line (the broken line in FIG. 6) which corresponds to the throttle opening degree obtained in the last time processing). Why it is renewed in this manner is because the continuity of the flow amount function is maintained. After renewal, the process proceeds to a Step S137.

In the Step S137, the error learnt FLG in the zone concerned is made to be "0". After that, the process proceeds to the Step S138.

In the Step S138, whether or not the processing has been performed with respect to all the zones is determined. If this determination is YES, the Zone ID is made to be "0" and the process proceeds to a Step S141. If NO, the process returns to the Step S131.

In the Step S141, this time driving cycle (DC) learnt FLG is made to be "1". Thereafter, this processing is ended.

According to the vehicle control system of this embodiment as described above, the following effect is performed.

In the vehicle control system according to this embodiment, in the case where the measurement of the air amount by the air flow meter has not been sufficiently performed at the first predetermined opening degree (the predetermined opening degree in the zone concerned) in the current driving cycle, the map correction section determines the correction amount in accordance with the approximate line result based on the air amount at the predetermined opening degree at which the measurement of the air amount by the air flow meter has been sufficiently performed with exception of the first predetermined opening degree.

According to this, since the correction amount is determined with respect to each of the plural zones, it is possible to cope with the variation of the flow amount reduction rate arising from the differences of the clogging, so that the estimation accuracy of the flowing air amount at the time of clogging can be improved thereby to improve A/F controllability to prevent a miss fire or the like. Further, the deposit accumulation amount may be detected even in the case where the vehicle does not have the idle state such as the HEV or the like.

Further, in this embodiment, in the case where the deviation between the approximate line result and the correction amount at the first predetermined opening degree (the predetermined opening degree in the zone concerned) in the previous operation cycle is smaller than the predetermined threshold value, the map correction section does not perform the renewal of the correction amount, and instead, it is provided with the correction renewal part 621 in the case where the deviation between the approximate line result and the correction amount at the first predetermined opening degree in the previous operation cycle is not smaller than the threshold value, the renewal of the correction amount is performed by using the weighted average value between the approximate line result and the correction amount as the correction amount.

According to this, even in the case where the sufficient flow amount function has not been calculated in the predetermined throttle opening degree, the flowing air amount at the time of the throttle clogging can be estimated accurately.

Further, the present invention is not limited to the above mentioned embodiment, and various modifications and improvements within the scope capable of achieving the object of the present invention will fall within the present invention.

For example, the control device 2 of the throttle valve 5 according to the above mentioned embodiment may be applied to other device which has the internal combustion engine, such as a hybrid vehicle or the like. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A control device of an internal combustion engine comprising:
 a map storage device configured to previously store, as a map, a characteristic of an intake air amount in accordance with an opening degree of a throttle valve, the throttle valve being provided in an intake passage of the internal combustion engine; and
 a map correction section configured to detect a deposit adhesion to the throttle valve by comparing a value of a flow rate function in a reference state with a value of the flow rate function based on an air amount in the intake passage measured by an air flow meter, at each of a plurality of predetermined opening degrees of the throttle valve, so as to correct the map according to a deposition rate of the deposit adhesion to the throttle valve;
 wherein the map correction section determines whether measurement of the air amount by the air flow meter has been performed sufficiently in a first predetermined opening degree in a current operation cycle, and determines, when the measurement of the air amount by the air flow meter has not been performed sufficiently in the first predetermined opening degree in the current operation cycle, a correction amount in accordance with an approximate line result based on the air amount at a predetermined opening degree other than the first predetermined opening degree at which the measurement of the air amount by the air flow meter is sufficiently performed.

2. The control device of the internal combustion engine according to claim 1, wherein the map correction section comprises a correction amount renewal part which:
- performs renewal of the correction amount by using a weighted average of the approximate line result and the correction amount as a correction amount in a case where a deviation between the approximate line result and the correction amount at the first predetermined opening degree in a previous operation cycle is not smaller than a threshold value, and
- does not perform the renewal of the correction amount in a case where the deviation between the approximate line result and the correction amount at the first predetermined opening degree in the previous operation cycle is smaller than the threshold value.

3. The control device of the internal combustion engine according to claim 1, wherein the map correction section determines the correction amount in accordance with the approximate line result based on the air amount at the first predetermined opening degree when the measurement of the air amount by the air flow meter has been performed sufficiently in the first predetermined opening degree in the current operation cycle.

4. The control device of the internal combustion engine according to claim 1, wherein the plurality of predetermined opening degrees of the throttle valve does not include an opening degree of the throttle valve with the internal combustion engine being in an idle state.

5. A control method of an internal combustion engine comprising the steps of:
(i) storing, as a map, in a map storage device a characteristic of an intake air amount in accordance with an opening degree of a throttle valve, the throttle valve being provided in an intake passage of the internal combustion engine; and
(ii) detecting by using a computer a deposit adhesion to the throttle valve by comparing a value of a flow rate function in a reference state with a value of the flow rate function based on an air amount in the intake passage measured by an air flow meter, at each of a plurality of predetermined opening degrees of the throttle valve, so as to correct the map according to a deposition rate of the deposit adhesion to the throttle valve;
wherein the step (ii) determines whether measurement of the air amount by the air flow meter has been performed sufficiently in a first predetermined opening degree in a current operation cycle, and
determines, when the measurement of the air amount by the air flow meter has not been performed sufficiently in the first predetermined opening degree in the current operation cycle, a correction amount in accordance with an approximate line result based on the air amount at a predetermined opening degree other than the first predetermined opening degree at which the measurement of the air amount by the air flow meter is sufficiently performed.

* * * * *